July 22, 1952 J. WITHERSPOON, JR 2,604,148
SAFETY CONTROL SYSTEM FOR FLUID FUEL BURNERS
Filed Jan. 28, 1949 2 SHEETS—SHEET 1

Inventor:
Jack Witherspoon Jr.,
by His Attorney.

Inventor:
Jack Witherspoon Jr.,
by Claude N. Mott.
His Attorney.

Patented July 22, 1952

2,604,148

UNITED STATES PATENT OFFICE 2,604,148

SAFETY CONTROL SYSTEM FOR FLUID FUEL BURNERS

Jack Witherspoon, Jr., Knoxville, Tenn., assignor to General Electric Company, a corporation of New York Application January 28, 1949, Serial No. 73,293

16 Claims. (Cl. 158—28)

My invention relates to control systems and apparatus for fluid fuel burners and the like, and more particularly to control systems of the thermal timing type in which all events in the operating and protective sequences are timed by electrically heated thermal timers.

It is a general object of my invention to provide a new and improved fluid fuel burner control system of the thermal timing type, and particularly such a system wherein the control apparatus is simple and inexpensive in construction, and durable and dependable in operation.

It is a more particular object of my invention to provide in such a system a new and improved combined lockout and recycling apparatus.

It is a further object of my invention to provide in a thermal timing control system for a fluid fuel burner a definite predetermined delay interval, or scavenging time, between flame failure and reinitiation of burner operation, such interval being independent of the condition of the flame detector when flame failure occurs.

It is another object of my invention to provide in a thermal timing system for a fluid fuel burner an electrically interlocked timing circuit providing for lockout and recycling operation in a new and improved manner.

It is a still further object of my invention to provide a fluid fuel burner control apparatus comprising mechanically and electrically interlocked thermal timers connected to control lockout and recycling operation in a new and improved manner.

Figure 1:
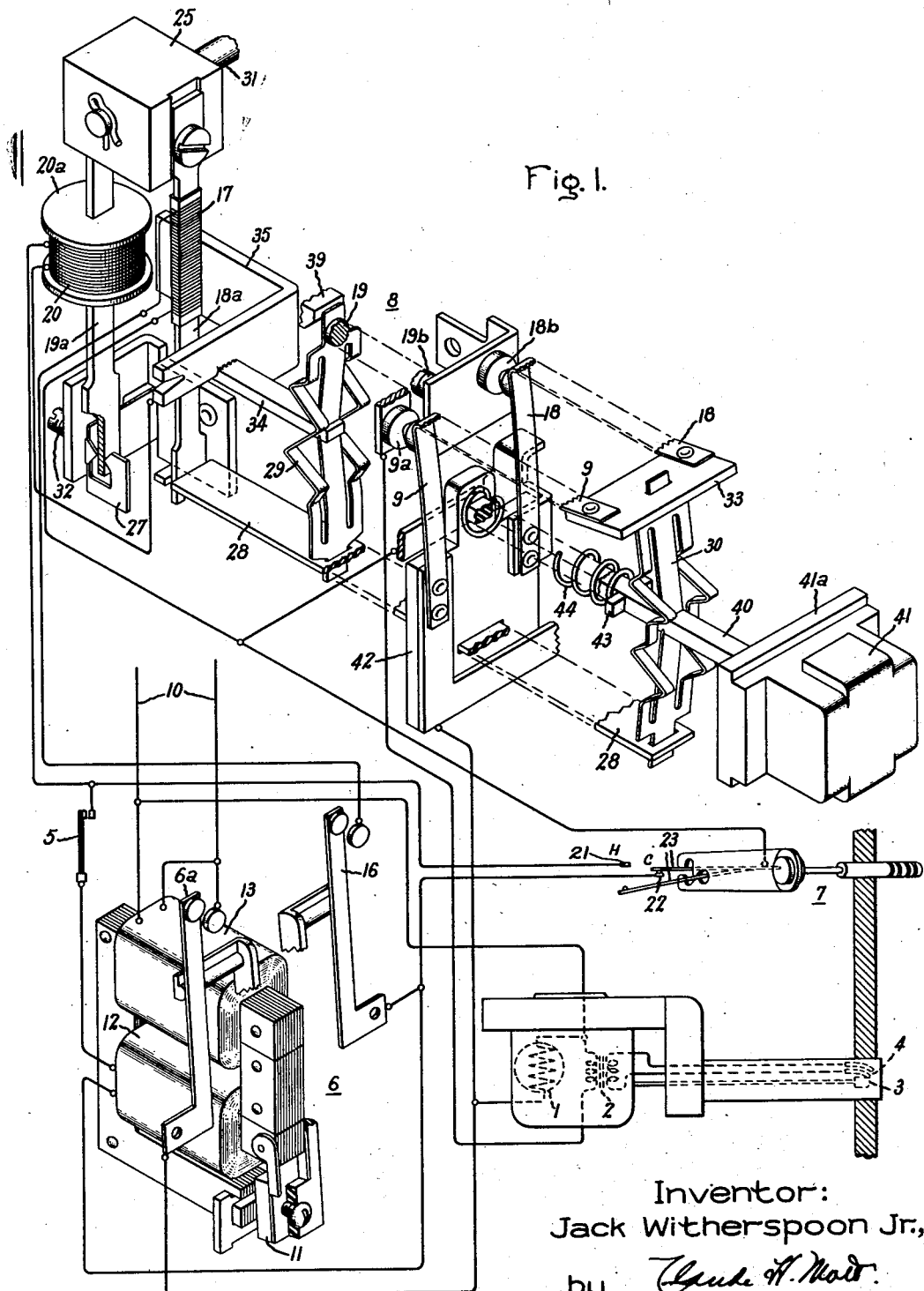
Figure 2:
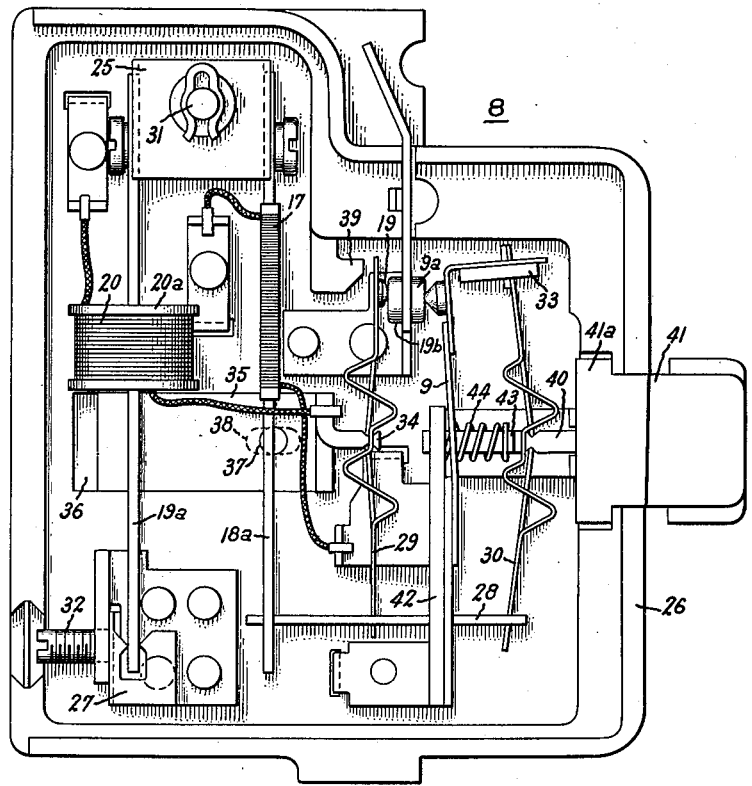

My invention itself will be more fully understood and its various objects and advantages further appreciated by referring now to the following detailed specification taken in conjunction with the accompanying drawings in which Fig. 1 is a diagrammatic illustration of a burner control apparatus embodying my invention, showing the thermal timing apparatus in exploded perspective view; Fig. 2 is a side elevational view of the thermal timing apparatus of Fig. 1, shown with the parts in assembled relation; and Fig. 3 is a schematic circuit diagram of the burner control apparatus shown diagrammatically at Fig. 1.

Referring now to the drawings, and particularly to Fig. 1, I have illustrated one preferred embodiment of my invention applied to the control of an oil burning apparatus comprising a pump motor 1, an ignition transformer 2, an oil supply nozzle 3 and a pair of ignition electrodes 4. The operation of the burner apparatus, and particularly the operation of the motor 1 and ignition transformer 2, is controlled by a room thermostat 5, a transformer relay 6, a flame detector 7 and a thermal timing apparatus 8. The flame detector 7 is fully described and claimed in a copending application Serial No. 74,786 filed on February 5, 1949 by Philip G. Hughes for Thermal Timing Apparatus, now Patent No. 2,512,331, granted June 20, 1950, and assigned to the same assignee as the instant application.

Figure 3:
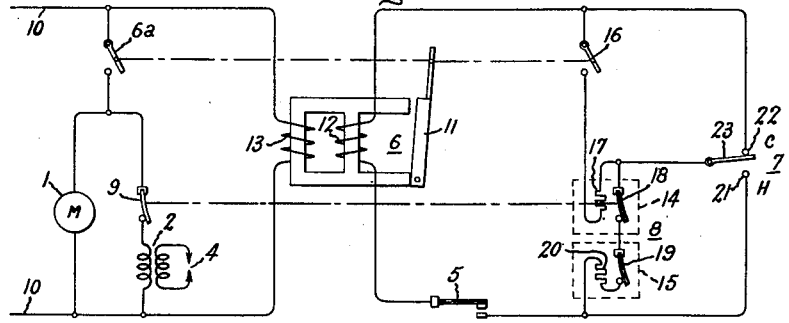

Referring now to Fig. 3, I have shown the motor 1 and ignition transformer 2 connected for energization in parallel circuit relation through a normally open contact 6a of the relay 6. The circuit through the ignition transformer 2 includes a normally closed contact 9 of the thermal timer 8. Through the relay contact 6a the motor and ignition transformer are connected to a pair of supply conductors 10. The conductors 10 are connected to a source of alternating current supply (not shown) which, for normal home operation, may suitably be of the 110 volt, 60 cycle type.

The transformer relay 6 is preferably of the type more fully described and claimed in the pending applications Serial No. 794,297, filed by Philip G. Hughes on December 29, 1947, now Patent No. 2,527,220, granted October 14, 1950, and Serial No. 794,298, filed by Phillip H. Estes on December 29, 1947, now abandoned both of which are assigned to the same assignee as the instant application. This relay comprises a three-legged magnetizable core having a movable outer leg or armature 11, a low voltage secondary winding 12 on the center leg and a high voltage primary winding 13 on the stationary outer leg. As will appear more fully hereinafter, the transformer relay 6 herein illustrated is preferably used in conjunction with my invention but is not an essential element thereof, for my invention may be equally well applied to the control of any electroresponsive burner control device, such as a conventional, externally energized electromagnetic relay or the like.

In the illustrated embodiment of my invention, the primary winding 13 of the transformer relay 6 is connected across the supply conductors 10, and the secondary winding 12 is connected to be completed, or short-circuited, through a series circuit including the room thermostat 5 and a pair of thermal timers 14 and 15 (Fig. 3) included in the thermal timing apparatus 8. This series circuit includes the room thermostat 5, a normally open holding contact 16 of the transformer relay 6, an electric heating resistor 17 of the thermal timer 14, a normally closed contact 18 of the thermal timer 14, a normally closed contact 19 of the thermal timer 15 and an electric heating resistor 20 of the thermal timer 15. The thermal timers 14 and 15 are connected in electrically interlocked relation through the "hot" and "cold" contacts 21 and 22, respectively, of the flame detector 7, so that the electric heating resistors 17 and 20 are effectively energized only alternatively. More particularly, the flame detector 7 is provided with a movable contact 23 arranged, when in engagement with the cold contact 22, to shunt the heating resistor 17 and the relay holding contact 16. The flame detector contact 23, when in engagement with the hot contact 21, provides a shunt circuit around the heating resistor 20 and the normally closed thermal timer contacts 18 and 19. The thermal timer 14 is connected to actuate also the normally closed ignition transformer contact 9.

In the foregoing arrangement illustrated at Fig. 3, the thermal timer 15 serves as a lockout timer, in that opening of its normally closed contact 19 effects deenergization of the burner motor 1 and ignition transformer 2. The thermal timer 14 serves as a recycling and ignition timer, in that its contact 9 controls the ignition shut-off and its contact 18 controls the scavenging time or delay interval between flame failure and reinitiation of burner operation. To facilitate such operation the heating time of the flame detector 7 is less than the heating time of the thermal lockout timer 15, and the cooling time of the flame detector 7 is less than the cooling time of the thermal recycling timer 14. Moreover, the resistance of the electric heating resistors 17 and 20 is such that when both these resistors are in series in the circuit of the relay winding 12 insufficient current flows in the winding to pick up the relay, but sufficient current is carried through the heating resistors 17 and 20 in series to hold the relay armature 11 in its attracted position if previously picked up.

The operation of the control system shown at Fig. 3 is as follows: Starting with the apparatus in its fully deenergized position, as shown, let it be assumed that the room thermostat 5 closes in response to a call for heat. Upon closure of the room thermostat 5, the normally open secondary winding 12 of the transformer relay 6 is completed through the room thermostat 5, the lockout heating resistor 20, the normally closed lockout contact 19, the normally closed recycling contact 18, and the normally closed cold contacts 22, 23 of the flame detector 7. Upon completion of the secondary winding 12, the relay armature 11 is attracted and closes the contacts 6a and 16. Closure of the contact 6a completes an energizing circuit for the motor 1 and the primary winding of the ignition transformer 2, the ignition transformer circuit including the normally closed thermal timer contact 9. Thus, the oil burner is set into operation. Closure of the relay contact 16 completes a holding circuit for the relay coil 12 in anticipation of opening of the flame detector contacts 22, 23.

If the oil is properly ignited, the resulting flame heats the flame detector 7 and the movable contact 23 leaves the cold contact 22. Prior to such flame detector contact separation, the lockout heater 20 was fully energized so that if no flame had occurred, the lockout contact 19 would have timed open after a predetermined interval, thereby to open the circuit of the relay winding 12 and deenergize the burner. Under normal starting operation, however, as soon as the contacts 22, 23 of the flame detector are separated, the heating resistor 17 is thrown in series circuit relation with the heating resistor 20, thereby to reduce the current in the circuit of the relay winding 12. This reduced current is sufficient to hold the relay armature in attracted position. The armature 11 is thus held attracted during the flame detector transfer interval when both heating resistors 17 and 20 are in series. The reduced current in the series circuit through the winding 12 and the heaters 17 and 20 during this transfer interval is also insufficient to appreciably heat the thermal timers 14 and 15 so that progress of the thermal timer 15 toward the lockout position is arrested as soon as the flame detector cold contacts 22, 23 are separated.

If flame continues in the burner uninterrupted, the flame detector movable contact 23 arrives, after a brief interval, at a position of contact engagement with the flame detector hot contact 21. In this position, a shunt circuit is provided through the hot contacts 21, 23 around the series connected thermal timer contacts 18 and 19 and the resistance heater 20. The lockout heater 20 being thus short circuited, begins to cool, and the recycling and ignition timer heater 17, being now fully energized by short circuiting of the heater 20, heats up to time its contacts 9 and 18 open. When the contacts 9 and 18 are opened after a predetermined delay interval, the ignition transformer 2 is deenergized by opening of the contact 9. Opening of the contact 18 has no immediate effect because this contact is in a series circuit which is presently short circuited through the contacts 21, 23 of the flame detector 7.

If the burner shuts down normally due to opening of the room thermostat 5, the circuit of the relay winding 12 is simply opened at the room thermostat 5, and the relay dropped out to shut down the burner. If, however, flame failure should occur for any reason before the room thermostat 5 opens, the circuit of the relay winding 12 is opened by separation of the flame detector contacts 21, 23. Under conditions of flame outage, whether it be due to normal shutdown by the room thermostat or to flame failure or momentary voltage failure or other cause, the flame detector movable contact 23 responds relatively rapidly by leaving the hot contact 21 and engaging the cold contact 22.

If flame failure is due to some cause other than normal shutdown by the room thermostat 5 so that the room thermostat is still closed, reengagement of the flame detector cold contacts 22 and 23 will not immediately restart the burner. The necessary delay interval between flame failure and recycling, which interval is allowed for natural draft scavenging of combustible gases from the furnace chamber, is controlled, not by the flame detector 7, but by the slower cooling recycling timer 14. As previously stated, the cooling time of the thermal timer 14 is longer than that of the flame detector. Moreover, the cooling time of the timer 14 is substantially independent of the conditions under which flame failure occurs, and therefore assures a substantially constant predetermined scavenging time. It will be evident that if flame failure occurs with the room thermostat 5 closed, recycling is initiated as soon as the thermal timer 14 recloses its contact 18 after the cooling interval.

From the foregoing review of the mode of operation of the illustrated embodiment of my invention, it will be readily understood that while I prefer to connect the series circuit through the thermal timer heaters 17 and 20 in series with the relay coil 12 and the room thermostat, the series connection of the resistance heaters and the relay coil is not an essential aspect of my invention. Parallel connection of the coil with a series circuit through the heaters is feasible, but presents some complications in switching which I prefer to avoid.

Referring now more particularly to Figs. 1 and 2, I have illustrated a preferred form of thermal timer structure in which the lockout and recycling timers 15 and 14, respectively, are mechanically interlinked to provide ambient temperature compensation and other desirable features. While mechanical interlinkage of the thermal timers 14 and 15 is not necessary to my invention in its broader aspects, such a combined thermal timer is desirable in that it provides not only ambient temperature compensation but also facilitates compensation of the timer for thermal resistance variations in the heating circuit, and permits a protective interlocking of the timer reset mechanism. The dual thermal timer illustrated at Figs. 1 and 2 is more fully described and claimed in a copending application Serial No. 71,504 filed by Philip G. Hughes on January 18, 1949 and assigned to the same assignee as the instant application.

From Figs. 1 and 2, it is evident that the combined recycling and lockout timer 8 comprises fundamentally a pair of elongated thermally deformable bimetallic strips 18a and 19a, each fixed at one end to a pivotally mounted movable supporting block 25 and extending outwardly therefrom in substantially parallel spaced relation. The block 25 is pivotally mounted on a base 26, and the extending end of the bimetallic strip 19a is held fixed relative to the base by means of an adjustable stop 27. The free end of the bimetallic strip 18a is linked by a flat strip of insulating material 28 to a pair of snap acting over-center switches 29 and 30.

Referring more particularly to Fig. 2, the dual thermal timer 8 is mounted in a base or housing 26, preferably formed of a suitable molded plastic insulating material open at one side and provided with the necessary abutments, apertures and recesses to accommodate the various parts of the timer. Within the casing 26, the movable supporting block 25 is rotatably mounted upon a pivot pin 31 projecting outwardly from the integral side wall of the casing. The bimetallic strips 18a and 19a are mounted at their upper ends in cantilever fashion on opposite sides of the supporting block 25 and depend therefrom in substantially parallel spaced relation. The bimetallic strips are so disposed on the block 25 that, if the block were held stationary and both strips heated, their free ends would move angularly in the same direction about the pivot pin 31 and block 25. That is, the bimetallic strips 18a and 19a tend to maintain substantial parallelism when equally heated. However, the depending or free end of the bimetallic strip 19a is unable to move with respect to the casing 26 because it is held fixed in the adjustable stop 27. The stop 27 is arranged to be moved slightly with respect to the casing 26 by a set screw 32, for adjustment.

The over-center switch members 29 and 30 are each of the integral spring plate type and each comprises a spring plate slotted to provide a pair of outer tension members and a pair of inner aligned compression members, the abutting ends of the compression members pivotally engaging a fixed or normally fixed supporting member. In the particular form of the switches herein shown, the outer tension strips of each switch member 29 and 30 are crimped to form tension springs which bias the central pivoted compression members to one side or the other of a dead center position. The upper end of the over-center switch member 29 carries the lockout contact 19, and the upper end of the over-center switch member 30 is connected by an insulating link 33 to a pair of cantilever spring contact arms 9 and 18, which constitute the ignition and recycling contacts, respectively. The lower movable ends of the snap action switch members 29 and 30 are each connected by the insulating link 28 to the depending free end of the bimetallic strip 18a. Snap action switch members of this type are claimed in Patent 2,429,813, issued to George M. Hausler on October 28, 1947.

The over-center snap action switch member 29 is pivotally mounted at its center upon a fixed but adjustable support 34. The pivotal support 34 is formed as an ear turned out from the projecting arm of an L-shaped mounting bracket 35. The mounting bracket 35 is positioned with one arm of the L lying in a rectangular recess 36 in the integral side wall of the casing 26. The bracket 35 is fixed in position by a bolt 37 and is adjustable within the range permitted by an elongated hole or slot 38 in the casing side wall through which the bolt 37 passes. The contact carrying end of the snap action switch member 29 stops in one direction of movement against a fixed contact 19b and in the other direction of movement against an abutment 39 formed integrally with the casing 26.

The snap action switch member 30 is mounted at its center upon the slidable shank 40 of a reset button 41 which projects through an aperture in the front wall of the casing 26. The head of the reset button 41 is slidably mounted in the front wall of the casing 26, and the inner end of the shank 40 is slidably mounted in an aperture formed at the upper end of an internal insulating support 42. The support or bracket 42 is fixed on the side wall of the casing 26 in substantially parallel spaced relation with the front casing wall. The fixed bracket 42 serves also as a support for the cantilever contact springs 9 and 18. The reset button shank 40 is provided intermediate its ends with a pair of oppositely projecting shoulders 43 and a helical compression spring 44 encircling the shank 40 is disposed between the shoulders 43 and the supporting bracket 42. The spring 44 biases the reset button 40, 41 to a normal position in which a shoulder 41a abuts against the front casing wall. The reset button shank 40 thus serves as a normally stationary support for the snap action switch member 30. The upper end of the switch member 30 is stopped in one direction of movement by engagement of the contact springs 9 and 18 with a pair of cooperating stationary contacts 9a and 18b, respectively, and in the other direction of movement by engagement of the insulating link 33 with the front wall of the casing 26.

The lockout heater 20 is mounted on the bimetallic strip 19a intermediate its ends, and is preferably arranged for relatively slow thermal response. In the form of the invention illustrated, the lockout heater 20 is of large diameter relative to the cross sectional area of the bimetallic strip 19a, and is concentrated over a small length of the strip. Preferably the heater 20 is wound upon a sleeve 20a formed of a natural or artificial rubber having relatively poor thermal conductivity. The recycling heater 17 is mounted upon the bimetallic strip 18a intermediate its ends, and is preferably arranged for a relatively quick thermal response. To this end the recycling heater 17 is wound in relatively close thermal contact with the bimetallic strip 18a, and is distributed along a considerable portion of the length of the strip.

In the normal unheated condition of the mechanism shown in the drawing, all the timer contacts 9, 18 and 19 are closed so that the overcenter biasing forces of the snap action switch members 29 and 30 are in opposition, i. e., tend to move the switch link 28 in opposite directions. The bimetallic strips 18a and 19a are so disposed on the movable supporting block 25 that, when heated, the strips move, or tend to move, their depending free ends toward the right, as viewed in the drawings.

In operation, when the bimetallic strip 19a is heated, it tends to move its depending free end toward the right. Such movement of the end of the strip 19a is, however, restrained by the stop 27 with the result that the strip 19a effects rotation of the pivotally mounted supporting block 25 in a clockwise direction, as viewed in the drawings. Such clockwise rotation of the supporting block 25 moves the depending free end of the bimetallic strip 18a to the left, as viewed in the drawings. On the other hand, heating of the bimetallic strip 18a causes its free end to move toward the right, thereby to counteract the rotational movement of the supporting block 25. Thus, it will be seen that with the bimetallic strips 19a and 18a extending outwardly from the pivotally mounted supporting block 25 and arranged to move or tend to move their free ends in the same angular direction with respect to the block when heated, an ambient temperature compensation is effected due to the action of the free strip in counteracting by its movement the deformation of the restrained strip.

The combined thermal timer shown at Fig. 2 is also compensated in its lockout action for resistance variations in the heater circuit due to temperature change in the lockout heater coil 20 and relay winding 12. Thus, a substantially constant predetermined lockout time is provided by the timer independently of the ambient temperatures in which the lockout heating resistor 20 and the relay coil 12 are operating. This avoids lengthening of the lockout timing interval upon recycling when the lockout heater and relay coil are operating at relatively high ambient temperatures due to self-heating. For this purpose, the lockout bimetal 19a is made somewhat longer, for example, about four or five per cent longer, than the recycling bimetal 18a. Thus, the timer is not fully compensated, or is slightly mismatched, for changes in ambient temperature. Such mismatching produces a slight motion of the switch link 28 in the lockout direction upon increase of ambient temperature with no heating current flowing. This slight motion in the lockout direction aids the lockout heater and compensates for the reduced heater current in the lockout heater resulting from increased coil resistance under high ambient temperature conditions. By proper proportioning of the length of the bimetallic elements 18 and 19, the lockout delay interval may be made substantially the same over a considerable range of ambient temperature. Also, it will be understood that by changing the degree of mismatching, the device may be compensated for resistance variations in both the lockout heater and the relay coil, or only in the lockout heater alone, depending upon the circuit used and the condition desired.

The normal operation of the thermal timer shown at Fig. 2 in the system previously described in conjunction with Fig. 3 is as follows: Upon closure of the room thermostat 5, the recycling heater 17 is short circuited and the lockout heater 20 energized. The bimetallic strip 19a is thus heated and deformed, and the movable support 25 is rotated clockwise, thereby to move the switch link 28 toward the lockout position (to the left as viewed in the drawings). This movement, however, is relatively slow due to the thermal characteristics of the lockout heater 20 so that if flame is established at the proper time, the flame detector 7 closes on its hot contact 21 before the lockout switch member 29 is snapped over center to open its contacts, thereby to short circuit the lockout heater and fully energize the recycling heater 17. Consequent heating of the recycling bimetal 18a and cooling of the lockout bimetal 19a reverses the motion of the switch link 28, thereby to move the link back toward its normal position and beyond this position (toward the right, as viewed at Fig. 2) to effect over-center opening operation of the recycling and ignition switch member 30. Upon shutdown of the burner for any cause, the recycling heater 17 is deenergized and the bimetal 18a allowed to cool. During this cooling interval, the switch link 28 is moved back toward its normal position, thereby to snap the switch member 30 over center and reclose the contacts 9 and 18. This reclosure interval of the contacts 9 and 19 upon cooling of the bimetallic strip 18a determines the recycling time, or scavenging interval, of the burner.

It will, of course, be understood that if, in the foregoing cycle, no flame is established, the flame detector 7 does not transfer its contacts. Under this condition, the recycling heater 17 remains short-circuited and the lockout heater 20 merely continues to cause deformation of the bimetal 19a to a limiting lockout position. This action moves the switch link 28 to the left as viewed in the drawings until the lockout contact 19 is snapped open. As more fully explained hereinafter, cooling of the bimetal 19a from this lockout position does not cause automatic reclosure of the contact 19.

As previously noted, when the switch link 28 is in its normal position with both the lockout contacts and the recycling contacts closed, the over-center biasing forces of the snap action switch members 29 and 30 are applied to the switch link 28 in opposition. Consequently, when either one or the other of the switch members 29 or 30 is in its contact opening position, the over-center biasing forces of both snap action switch members are applied in aiding relation to the switch link 28. In the open position of the switch member 30 these aiding over-center forces are insufficient to overcome the appreciable return force of the bimetallic member 18a as it is cooled. On the other hand, the normal position of the lockout switch member 29 is much closer to its dead center position than are the corresponding positions of the switch member 30 so that when the lockout switch member is in its contact opening position, the bimetallic strip 18a is only slightly deformed and its return force is insufficient to overcome the combined over-center biasing forces of the two switch members 29 and 30. This adjustment ensures that the lockout contact 19 will remain open after the thermal timer has cooled following lockout on flame failure. It is to reset the lockout switch member 19 that the reset button 40, 41 is provided.

It will be noted that the reset button 40, 41 does not directly engage either the lockout switch member 29 or the switch link 28, but rather actuates the switch link 28 only through over-center action of the snap action switch member 30. This is a safety feature which positively ensures opening of the contacts 9 and 18 prior to reclosure or resetting of the lockout contact 19. In resetting operation with the lockout contact 19 open, the reset button 40, 41 is pushed inwardly to move the normally stationary central pivot points of the snap action switch member 30 over center with respect to its ends. By this movement, the switch member 30 is snapped to its open circuit position, thereby opening its contacts 9 and 18 and reversing its over-center biasing force applied to the switch link 28. The thus reversed over-center biasing force of the switch member 30 aids the return force of the bimetallic strip 18a, and together these forces are sufficient to overcome the opening bias of the lockout switch member 29 so that the switch link 28 is moved to the right, as viewed in the drawings, to snap the switch member 29 over-center and reclose the lockout contact 19. The reset button 40, 41 is then released and returned to its normal position under the influence of the return spring 44. In so returning to its normal position, the reset button effects reclosing operation of the snap action switch member 30.

From the foregoing detailed description, it will now be evident that in the dual thermal timer shown at Fig. 2, it is not essential that the bimetallic strips 18a and 19a extend from the supporting block 25 in parallel spaced relation but, if desired, these bimetallic strips may extend from the block 25a in any desired angular spaced relation. Moreover, it will be evident that the interlocking reset arrangement described above in conjunction with the two snap action switch members 29 and 30 is not limited in its application to an ambient temperature compensated thermal timer, but is equally applicable to any oppositely disposed pair of over-center switch members actuated by a common actuating member. Thus, while I have described and illustrated only a preferred embodiment of my invention by way of example, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In a control system for a fluid fuel burner including fuel feeding means and fuel ignition means, the combination comprising electro-responsive means for initiating operation of said fuel feeding and ignition means, a pair of thermal timers having resistance heating elements connected for energization in series circuit relation with each other and with said electro-responsive means, one said thermal timer including a pair of switch contacts connected when actuated to disable said electro-responsive means and the other said thermal timer including a first pair of switch contacts adapted when actuated to disable said ignition means and a second pair of switch contacts connected in said series circuit and adapted to open said series circuit when actuated, and a flame detector having a pair of contacts closed in the presence of flame to shunt the heating element of said one thermal timer and a second pair of contacts closed in the absence of flame to shunt the heating element of said other thermal timer.

2. In a control system for a fluid fuel burner adapted to heat a space and including fuel feeding means and fuel ignition means, the combination comprising electro-responsive means for initiating operation of said fuel feeding and ignition means, a pair of thermal timers having resistance heating elements connected in series circuit relation with each other, switching means responsive to the temperature of said space for simultaneously connecting said electro-responsive means and said heating elements for energization, one said thermal timer including a pair of switch contacts connected when actuated to disable said electro-responsive means and the other thermal timer including a first pair of switch contacts adapted when actuated to disable said ignition means and a second pair of switch contacts connected in said series circuit and adapted to open said series circuit when actuated, and a flame detector having a pair of contacts closed in the presence of flame to shunt the heating element of said one thermal timer and a second pair of contacts closed in the absence of flame to shunt the heating element of said other thermal timer.

3. In a control system for a fluid fuel burner including fuel feeding means and fuel ignition means, the combination comprising electro-responsive means for initiating operation of said fuel feeding and ignition means, a pair of thermal timers having resistance heating elements connected in series circuit relation with each other and with said electro-responsive means, a room thermostat connected to control said electro-responsive means and said heating elements, one said thermal timer including a pair of switch contacts connected when actuated to disable said electro-responsive means and said heating elements and the other thermal timer including a first pair of switch contacts adapted when actuated to disable said ignition means and a second pair of switch contacts in said series circuit and adapted to open said series circuit when actuated, and a flame detector having a pair of contacts closed in the presence of flame to shunt the heating element of said one thermal timer and a second pair of contacts closed in the absence of flame to shunt the heating element of said other thermal timer.

4. In a control system for a fluid fuel burner and including fuel feeding means and fuel ignition means, the combination comprising electro-responsive means for initiating operation of said fuel feeding and ignition means, a pair of thermal timers having resistance heating elements connected in series circuit relation with each other and with said electro-responsive means, one said timer including a pair of switch contacts connected when actuated to disable said electro-responsive means, the other said timer including a first pair of switch contacts adapted when actuated to disable said ignition means and a second pair of switch contacts connected when actuated to disable said series circuit through said heating elements, and a flame detector including means actuated in the presence of flame to render said second pair of switch contacts ineffective to disable said series circuit, said flame detector having a pair of switch contacts closed in the presence of flame to shunt the heating element of said one thermal timer and another pair of switch contacts closed in the absence of flame to shunt the heating element of said other thermal timer.

5. In a control system for a fluid fuel burner including fuel feeding means and fuel ignition means, the combination comprising electro-responsive means for initiating operation of said fuel feeding and ignition means, a pair of thermal timers having resistance heating elements connected in series circuit relation with each other and for energization simultaneously with said electro-responsive means, one said timer including switching means connected to disable said electro-responsive means and to interrupt said series circuit through said heating elements, the other said timer including second switching means adapted when actuated to disable said ignition means and to interrupt said series circuit, an element movable in response to the presence of flame in said burner, first circuit control means actuated by said flame-responsive element and effective in the presence of flame to shunt the heating element of said one thermal timer and to complete a circuit through the heating element of said other thermal timer independently of the series circuit interrupter associated therewith, and second circuit control means actuated by said flame-responsive element and effective in the absence of flame to shunt the heating element of said other thermal timer.

6. In a control system for a fluid fuel burner, the combination comprising electro-responsive means for initiating operation of said burner, a pair of thermal timers having resistance heating elements connected in series circuit relation with each other and for energization simultaneously with said electro-responsive means, one said timer including switching means connected when actuated to disable said electro-responsive means and the other said timer including switching means connected when actuated to interrupt said series circuit through said heating elements, and a flame detector having a pair of switch contacts closed in the presence of flame to shunt the heating element of said one thermal timer and a second pair of contacts closed in the absence of flame to shunt the heating element of said other thermal timer.

7. In a control system for a fluid fuel burner, the combination comprising electro-responsive means for initiating operation of said burner, a pair of thermal timers having resistance heating elements connected in series circuit relation with each other and with said electro-responsive means, one said timer including switching means connected when actuated to interrupt said series circuit thereby to disable said electro-responsive means and heating elements, second switching means actuated by the other said timer for interrupting said series circuit, and a flame detector having a pair of contacts closed in the presence of flame to shunt said second switching means and the heating element of said one thermal timer and a second pair of contacts closed in the absence of flame to shunt the heating element of said other thermal timer, said other thermal timer having a cooling time longer than the cooling time of said flame detector, whereby said second switching means controls the minimum recycling time of said system.

8. In a control system for a fluid fuel burner, the combination comprising electro-responsive means for initiating operation of said burner, a pair of thermal timers having resistance heating elements connected in series circuit relation with each other and for energization simultaneously with said electro-responsive means, one said timer including switching means connected when actuated to disable said electro-responsive means and to interrupt said series circuit through said heating elements, the other said timer including second switching means connected when actuated to interrupt said series circuit through said heating elements, means responsive to the presence of flame in said burner, first circuit control means actuated by said flame-responsive element and effective in the presence of flame to shunt the heating element of said one thermal timer and to complete a circuit through the heating element of said other thermal timer independently of the series circuit interrupter associated therewith, and a second circuit control means actuated by said flame-responsive element and effective in the absence of flame to shunt the heating element of said other thermal timer.

9. In a control system for a fluid fuel burner, the combination comprising electro-responsive means for initiating operation of said burner, a pair of thermal timers having resistance heating elements connected in series circuit relation with each other and for energization simultaneously with said electro-responsive means, one said timer including a pair of switch contacts connected when actuated to effect deenergization of said electro-responsive means and interruption of the series circuit through said heating elements, the other said timer including a second pair of switch contacts connected when actuated to interrupt the series circuit through said heating elements, flame-responsive means including a member movable in response to the presence of flame in said burner, first switching means actuated by said movable member and effective in the absence of flame to provide a shunt circuit around the heating element of said other thermal timer, and second switching means actuated by said movable element and effective in the presence of flame to provide a shunt circuit around the heating element of said one thermal timer and to provide a circuit through the heating element of said other thermal timer and to render said second pair of switch contacts ineffective to interrupt said latter circuit, said flame-responsive means having a resetting time shorter than the resetting time of said other thermal timer, whereby said second pair of switch contacts determines the minimum delay interval between interruption of said flame and reinitiation of said burner operation.

10. In a control system for a fluid fuel burner, the combination comprising electro-responsive means for initiating operation of said burner, a pair of thermal timers having resistance heating elements connected for energization in series circuit relation with each other and with said electro-responsive means, one said timer including a pair of switch contacts connected when actuated to effect deenergization of said series circuit and the other said timer including a second pair of switch contacts connected when actuated to effect deenergization of said series circuit, flame-responsive means including an element movable in response to the presence of said flame in said burner, first switching means actuated by said movable element and effective in the absence of flame to provide a shunt circuit around the heating element of said other thermal timer, and second switching means actuated by said movable element and effective in the presence of flame to provide a shunt circuit around the heating element of said one thermal timer and to render said first and second pairs of switch contacts ineffective to interrupt said series circuit.

11. In a control system for a fluid fuel burner, the combination comprising electro-responsive means for initiating operation of said burner, a pair of thermal timers having resistance heating elements connected for energization in series circuit relation with each other and with said electro-responsive means, each of said thermal timers including a pair of normally closed switch contacts connected in said series circuit and effective when actuated to interrupt said series circuit, flame-responsive means including a member movable in response to the presence of flame in said burner, first switching means actuated by movable member and effective in the absence of flame to shunt the heating element of one of said thermal timers, and second switching means actuated by said movable member and effective in the presence of flame to shunt the heating element of the other of said thermal timers and both said first and second pairs of normally closed switch contacts, said one thermal timer having a resetting time longer than the resetting time of said flame-responsive means, whereby said one thermal timer determines the minimum interval between flame failure and reinititaion of operation of said burner.

12. In a control system for a fluid fuel burner including fuel feeding means and fuel ignition means, the combination comprising electro-responsive means for initiating operation of said fuel feeding and ignition means, a pair of thermal timers having resistance heating elements connected for energization in series circuit relation with each other and with said electro-responsive means, a room thermostat connected to control the energization of said electro-responsive means and said heating elements, each of said thermal timers including a normally closed pair of switch contacts connected in said series circuit intermediate the heating elements of said thermal timers and arranged when actuated to interrupt said series circuit, one of said thermal timers including switching means adapted when actuated to effect deenergization of said ignition means, flame-responsive means including an element movable in response to the presence of flame in said burner, first switching means actuated by said movable element and effective in the absence of flame to complete a shunt circuit around the resistance heating element of said one thermal timer, and second switching means actuated by said movable element and effective in the presence of flame to complete a shunt circuit around the resistance heating element of the other said thermal timer and around said two pairs of normally closed switch contacts, the resetting time of said one thermal timer being longer than the resetting time of said flame-responsive means, whereby said one thermal timer determines the minimum delay interval between flame interruption and reinitiation of operation of said burner.

13. In a control system for a fluid fuel burner, the combination comprising electro-responsive means for initiating operation of said burner, thermal timing means including a pair of thermally deformable members connected together in opposing relation, a first movable member controlled by said deformable members, a pair of resistance heating elements each associated with one of said deformable members and connected for energization in series circuit relation with each other and simultaneously with said electro-responsive means, a first pair of switch contacts actuated by movement of said movable member in one direction upon heating of one of said resistance elements to effect deenergization of said electro-responsive means and interruption of said series circuit through said heating elements, a second pair of switch contacts actuated by movement of said movable member in the opposite direction upon heating of the other of said resistance elements and connected when actuated to interrupt said series circuit, flame-responsive means including a second movable member actuable in response to the presence of flame in said burner, first switching means actuated by said second movable member and effective in the absence of flame to complete a shunt circuit around said other resistance element, and second switching means actuated by said second movable member and effective in the presence of flame to provide a shunt circuit around said one resistance element and to render said one pair of switch contacts ineffective to interrupt the circuit through said other resistance element.

14. In a control system for a fluid fuel burner, the combination comprising electro-responsive means for initiating operation of said burner, thermal timing means including a pair of deformable thermal-responsive members connected together in opposing relation, a pair of resistance heating elements each associated with one of said deformable members and connected for energization in series circuit relation with each other and with said electro-responsive means, a first pair of normally closed switch contacts connected in said series circuit and actuable by movement of said deformable members in one direction to interrupt said circuit, a second pair of normally closed switch contacts connected in said series circuit and actuable upon movement of said deformable members in the other direction to interrupt said series circuit, and a flame detector including a pair of normally closed switch contacts effective in the absence of flame to complete a shunt circuit around the resistance heating element effective to actuate said second pair of switch contacts, said flame detector including also a pair of normally open switch contacts effective when actuated in the presence of flame to complete a shunt circuit around both said first and second pair of switch contacts and the resistance heating element effective to actuate said first pair of switch contacts, whereby actuation of said first pair of switch contacts upon failure of initiation of flame determines the lockout interval of said electro-responsive means and resetting of said second pair of switch contacts upon failure of flame determines the minimum recycling interval between flame failure and reinitiation of operation of said burner.

15. In a control system for a fluid fuel burner, the combination comprising a transformer relay including a normally open secondary winding and a magnetizable member adapted to be actuated upon completion of said winding, means actuated by movement of said magnetizable member for initiating operation of said burner, a pair of thermal timers having resistance heating elements connected in series circuit relation with each other and with said secondary winding, one said timer including a pair of switch contacts connected when actuated to interrupt said series circuit and the other said timer including a second pair of switch contacts connected when actuated to interrupt said series circuit, flame-responsive means including an element movable in response to the presence of flame in said burner, first switching means actuated by said movable element and effective in the absence of flame to provide a shunt circuit around the heating element of said other thermal timer, second switching means actuated by said movable element and effective in the presence of flame to provide a shunt circuit around the heating element of said one thermal timer and to render said first and second pairs of switch contacts ineffective to interrupt said series circuit.

16. In a control system for a fluid fuel burner adapted to heat a space, the combination comprising a transformer relay including a normally open secondary winding and a movable magnetizable member adapted to be actuated upon completion of said secondary winding, switching means actuated by said movable magnetizable member for initiating operation of said burner upon completion of said secondary winding, a pair of thermal timers having resistance heating elements connected in series circuit relation with said secondary winding, one said timer including a pair of switch contacts connected when actuated to interrupt said series circuit and the other said timer including a second pair of switch contacts connected when actuated to interrupt said series circuit, flame-responsive means including an element movable in response to the presence of flame in said burner, first switching means actuated by said movable element and effective in the absence of flame to provide a shunt circuit around the heating element of said other thermal timer, second switching means actuated by said movable element and effective in the presence of flame to provide a shunt circuit around said first and second pairs of switch contacts and the heating element of said one thermal timer, and switching means connected to make or break said series circuit in response to the temperature of said space.

JACK WITHERSPOON, Jr.

REFERENCES CITED

The following references are of record in the file of this patent:

UNITED STATES PATENTS

| Number | Name | Date |
|---|---|---|
| 2,113,858 | Ray | Apr. 12, 1938 |
| 2,170,426 | Raney | Aug. 22, 1939 |
| 2,230,732 | Tapp, et al. | Feb. 4, 1941 |
| 2,269,443 | Deubel | Jan. 13, 1942 |
| 2,358,432 | Wolfner | Sept. 19, 1944 |
| 2,449,858 | Ottmar | Sept. 21, 1948 |
| 2,486,612 | Pratt | Nov. 1, 1949 |